Reissued Jan. 27, 1931

Re. 17,940

UNITED STATES PATENT OFFICE

ALFRED THAUSS, OF DENTZ, NEAR COLOGNE, AND ALFRED GÜNTHER, OF COLOGNE, GERMANY, ASSIGNORS, BY MESNE ASSIGNMENTS, TO GENERAL ANILINE WORKS, INC., OF NEW YORK, N. Y., A CORPORATION OF DELAWARE

SULPHURIZED COMPOUND OF PHENOL

No Drawing. Original No. 1,450,463, dated April 3, 1923, Serial No. 490,747, filed August 8, 1921. Application for reissue filed October 31, 1930. Serial No. 492,610.

This invention relates to the manufacture of new mordants. They consist of new sulphurized compounds of phenol, its homologues and its substitution products, such as cresols, chlorphenols, and the like, and are obtained by heating phenol or its homologues or substitution products with aqueous caustic alkali and sulfur, in practice in quantities larger than the molecular proportions. The new sulfur derivatives are easily absorbed by undyed cotton fiber and act as mordants for basic colors. The dyeings thus obtained are faster to washing and to light than those produced on tannin. The new compounds are generally yellowish powders.

The invention is illustrated by the following example, the parts being by weight:—26 parts of orthochlorphenol are dissolved in 20 parts of hot water and 8.5 parts of sodium hydroxid. On the addition of 10 parts of sulfur, i. e., about 1½ mols of sulfur to each mol of orthochlorphenol used, this solution is heated at boiling in a vessel provided with a reflux condenser. The resinous reaction product thus produced, which solidifies to a brittle, vitreous mass on cooling, is separated from the aqueous liquor, dissolved in 15 parts of sodium carbonate and 200 parts of hot water, and finally salted out with sodium sulfate. The greenish paste thus obtained is dried by heating in vacuo until after cooling a test turns solid and pulverulent. The dry product is readily soluble at room temperature in organic solvents, such as ethyl alcohol or acetone. The sodium salt is soluble in cold and easily soluble in warm water.

Analogous compounds are obtained when orthochlorphenol is replaced by the para-product, the phenol itself, the cresols, the di- or polychlor- or the corresponding bromphenols.

For dyeing purposes the product prepared according to the above example from orthochlorphenol is dissolved, for example, in sodium carbonate solution.

Cotton is mordanted with 5 per cent of this product (weight of the dry substance) at 70° C. for half an hour with the addition of 50 per cent of common salt. After wringing well, rinse and dye with the basic colors in the usual manner.

The compounds obtained from the homologues and substitution products of phenol are prepared and fixed on cotton in the same manner as above mentioned.

Yarns are with advantage treated in the same way, the material remaining being left in the bath to cool down over night.

It is remarkable that basic dyestuffs, such as rhodamin B extra, methylviolet B, auramin O and others possess after this process of fixing the same shades as those produced by the tannin method.

The new mordants may be added to a dye bath containing a substantive cotton dyestuff and a sulfur dyestuff the dyeing being after-treated with a basic dyestuff. The colors hereby obtained are better fixed or more intense than those topped according to methods hitherto known.

We claim:

1. The hereindescribed new sulphurized compounds of phenols which are obtainable by boiling about 1 mol of a phenol with aqueous caustic alkali and about 1½ mol of sulfur whereby a resinous reaction product which solidifies to a brittle vitreous mass on cooling is produced, which compounds after purification are generally yellowish powders being mordants for fixing basic dyes on cotton and being soluble in alcohol and acetone, substantially as described.

2. The hereindescribed new sulphurized compound of orthochlorphenol which is obtainable by boiling about 1 mol of orthochlorphenol with aqueous caustic alkali and about 1½ mol of sulfur whereby a resinous reaction product which solidifies to a brittle vitreous mass on cooling is produced, which compound after purification is a yellowish powder being a mordant for fixing basic dyes on cotton and being soluble in alcohol and acetone, substantially as described.

In testimony whereof we affix our signatures.

ALFRED THAUSS.
ALFRED GÜNTHER.